United States Patent [19]
Goering

[11] Patent Number: 6,052,977
[45] Date of Patent: Apr. 25, 2000

[54] SINGLE BOLT STRIPPING FINGER INSERT

[75] Inventor: Kevin Jacob Goering, Cambridge, Iowa

[73] Assignee: Deere & Company, Moline, Ill.

[21] Appl. No.: 09/153,388

[22] Filed: Sep. 15, 1998

[51] Int. Cl.[7] ..................................................... A01D 46/08
[52] U.S. Cl. .................................................. 56/34; 56/127
[58] Field of Search ................................ 56/34, 127, 130

[56] References Cited

U.S. PATENT DOCUMENTS

| | | |
|---|---|---|
| Re. 25,667 | 10/1964 | Jezek . |
| 131,124 | 9/1872 | Sims . |
| 3,067,561 | 12/1962 | Jezek . |
| 3,380,232 | 4/1968 | Jezek . |
| 4,358,921 | 11/1982 | Pustejovsky ................................ 56/34 |

*Primary Examiner*—James A. Lisehora

[57] ABSTRACT

A stripping finger insert is attached with a single bolt for easy adjustment of the gap between fingers on an ultra narrow row cotton stripper. The point of the insert wedges underneath a rearwardly angled edge of an upright planar fin member located at the front and center of the finger. The single bolt secures the insert near the center of the finger where cotton snagging is less likely to occur, and a clip allows the bolt to be placed through the center of the angle iron, rather than in the legs of the angle, to eliminate an obstruction for the cotton between the fingers. The clip fits precisely into the profile of the insert and has a flat surface on top for clamping the bolt with gently sloping front and rear surfaces for smooth cotton can flow. Two insert sizes provide five different gap adjustments to optimize productivity.

8 Claims, 2 Drawing Sheets

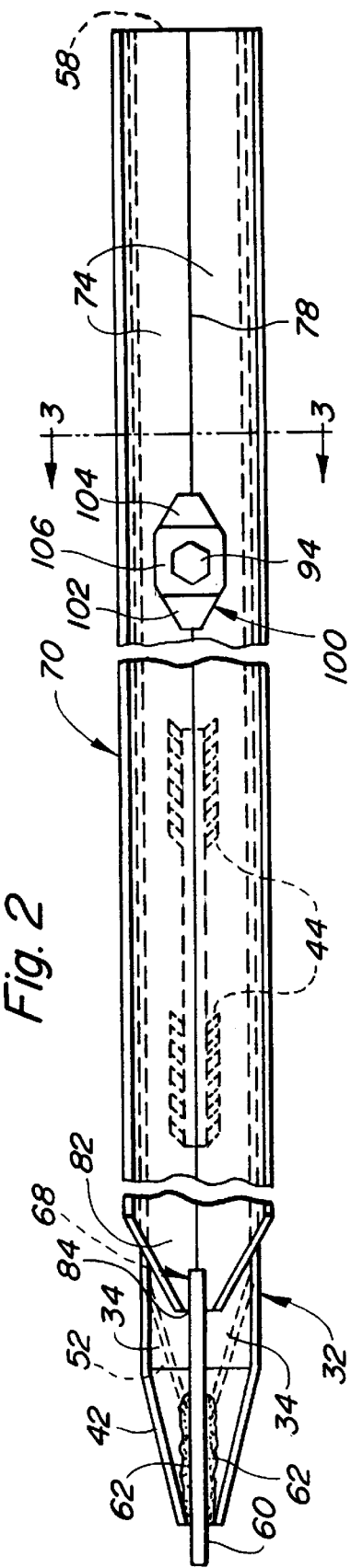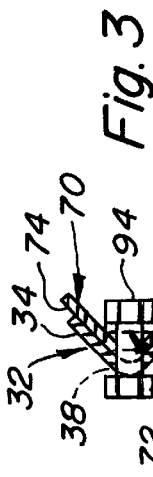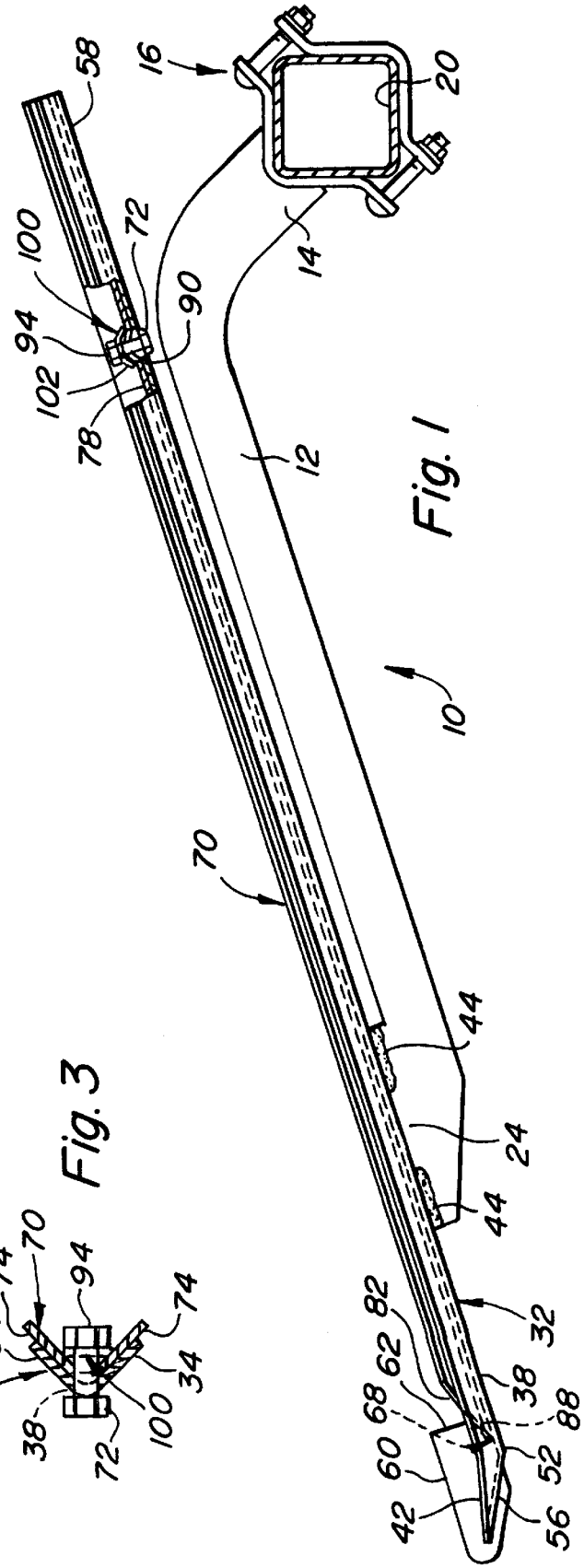

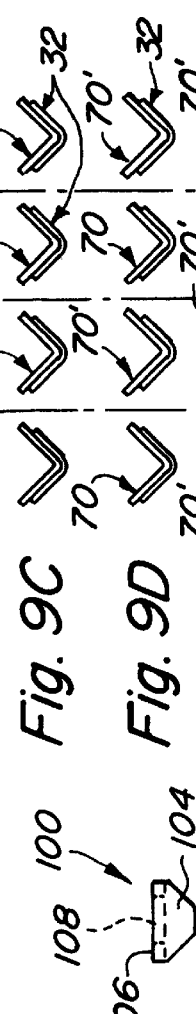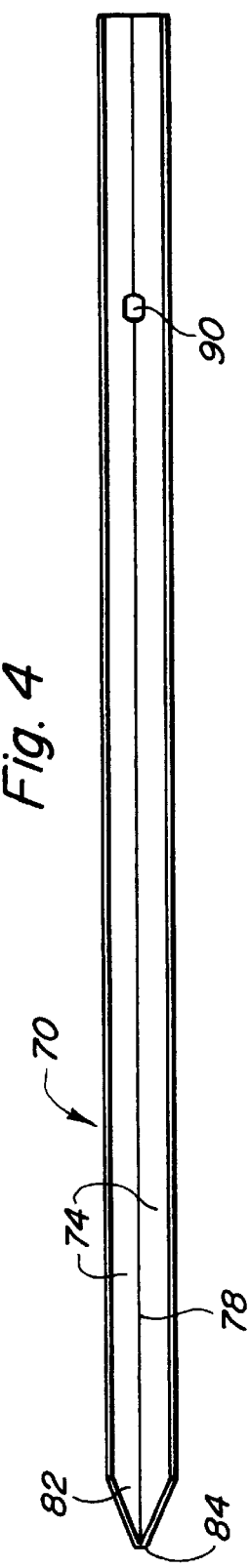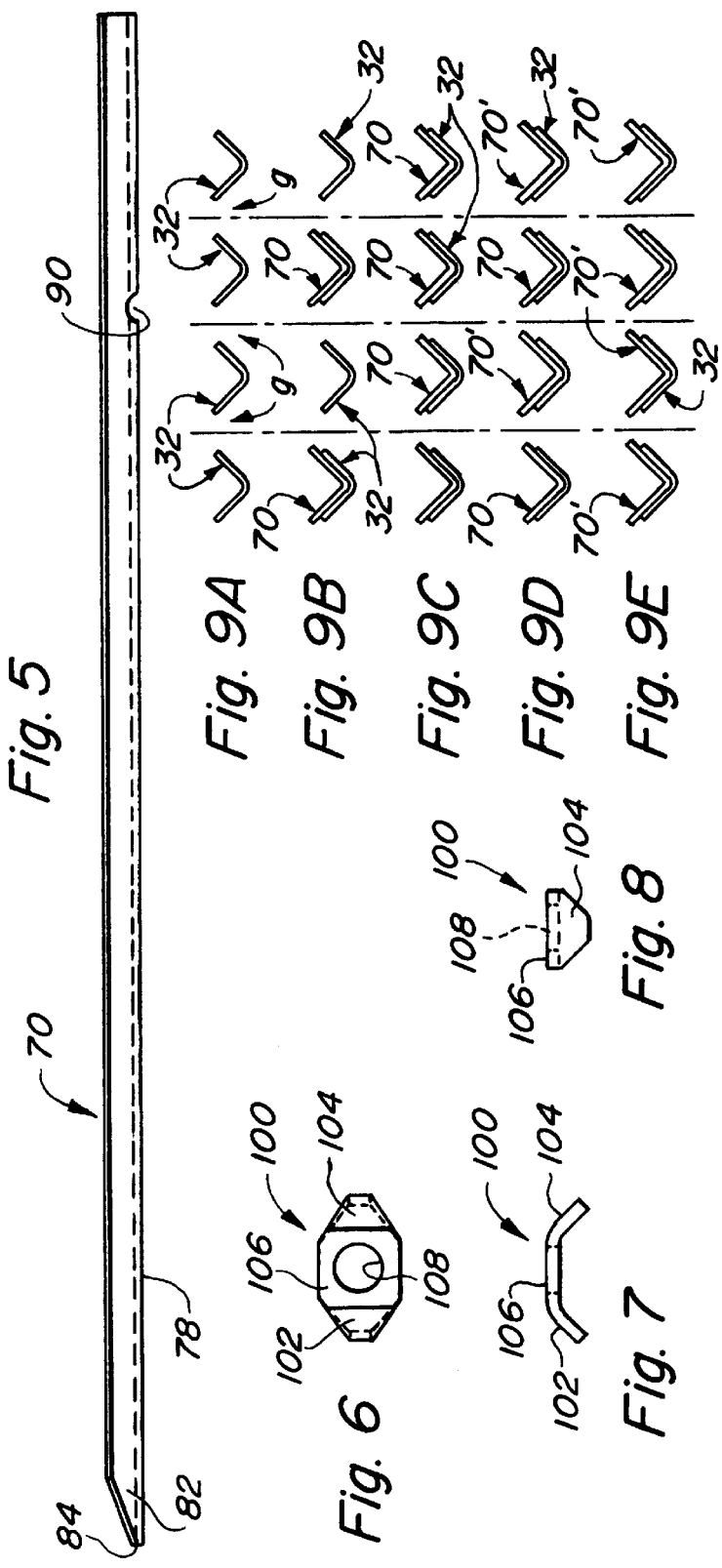

SINGLE BOLT STRIPPING FINGER INSERT

BACKGROUND OF THE INVENTION

1) Field of the Invention

The present invention relates generally to finger type cotton strippers for harvesting ultra narrow row cotton (UNRC) and, more specifically, to an insert for the stripping fingers for changing the gap between adjacent fingers.

2) Related Art

UNRC strippers typically include a fingerhead having narrowly spaced fingers. A typical fingerhead attachment is shown in U.S. Pat. No. 4,358,921 assigned to Allis-Chalmers. Cotton plants are directed between the fingers which remove the cotton bolls from the plants. One of the most important factors affecting stripping efficiency of the fingerhead is the spacing between the fingers. If the gap is too narrow, the head will strip bark and branches and pull stalks out of the ground. If the gap is too wide, cotton bolls will be missed and efficiency will be reduced.

One method of adjusting finger gap involves the time-consuming and tedious task of adding or removing fingers and moving all the fingers along a support on the head. The above-mentioned U.S. Pat. No. 4,358,921 shows another adjustment method wherein a finger insert is connected to the finger with two bolts. Although this method has made gap changing easier, the task is still very time consuming, and the insert attaching bolts protrude from the side of the finger where they can catch cotton and cause plugging.

BRIEF SUMMARY OF THE INVENTION

It is therefore an object of the present invention to provide an improved finger insert construction for adjusting the spacing between stripping fingers on a header. It is a further object to provide such an insert construction which overcomes most or all of the aforementioned problems.

It is a further object of the present invention to provide an improved finger insert construction for adjusting the spacing between stripping fingers on a header with an insert that is easy to attach and remove. It is still another object to provide such an insert which requires only a single attaching bolt. It is a further object to provide such an insert which is less prone to catch cotton than at least most previously available inserts.

It is a further object of the present invention to provide an improved finger insert construction which provides easy stripper gap adjustability for accommodating a wide range of plant sizes without bark stripping. It is another object to provide such a construction having a variety of gap settings utilizing inserts of only two different sizes.

It is yet another object to provide an improved mounting bolt clip for a finger insert which reduces locations on a finger where cotton can snag. It is yet another object to provide such a clip which facilitates mounting of the attaching bolt at the vertex of the insert and which provides a smooth surface for good cotton flow characteristics.

A stripping finger insert is connected to a finger by a single bolt for easy attachment and removal. The insert has a forward point which wedges underneath an upright planar divider fin located at the front and center of the finger. A single bolt secures the insert to the finger, and a clip allows the bolt to be easily placed through the center of the angle iron to provide a firm, snag free connection, rather than in the legs of the angle, to eliminate an obstruction for the cotton between the fingers. The clip has a flat surface on top for clamping the bolt and gently sloping front and rear surfaces for smooth cotton flow. The clip is designed to fit precisely into the profile of the insert to eliminate holes or protrusions that could snag cotton.

The wedging action at the point and use of a single bolt decreases the time needed to add or replace inserts. Cotton catching areas on the finger are minimized to significantly reduce cotton plugging, and the centrally located bolt is less likely to catch cotton than more rearwardly located bolts. Two insert sizes provide five different gap adjustments to optimize productivity while eliminating plant and branch stripping and pulling of the plants out from the ground.

These and other objects, features and advantages of the present invention will become apparent to one skilled in the art upon reading the following detailed description in view of the drawings.

BRIEF DESCRIPTION OF THE DRAWINGS

FIG. 1 is a side view of a finger assembly with an insert shown attached to the finger.

FIG. 2 is an enlarged top view of the finger assembly of FIG. 1.

FIG. 3 is an end view of the finger and insert, taken generally along lines 3—3 of FIG. 2, showing details of the single mounting bolt and clip.

FIG. 4 is a top view of the insert of FIG. 1.

FIG. 5 is a side view of the insert of FIG. 4.

FIG. 6 is an enlarged top view of the clip of FIG. 3.

FIG. 7 is a side view of the clip of FIG. 6.

FIG. 8 is an end view of the clip of FIG. 6.

FIG. 9A–9E are views taken along the axis of the inserts showing the five different stripping gap dimensions, from largest to smallest, obtainable with two sizes of inserts.

DETAILED DESCRIPTION OF THE DRAWINGS

Referring now to FIG. 1, therein is shown a finger assembly 10 having a fore-and-aft extending finger mount 12. The finger mount 12 is generally planar and includes an aft down-turned mounting end 14 connected by a bracket and bolt assembly 16 to a tubular finger assembly support 20 fixed to the fingerhead of a conventional finger type cotton stripper (not shown) generally of the type described in U.S. Pat. No. 4,358,921. The finger mount 12 angles downwardly in the forward direction (to the left as shown in FIG. 1) to an upwardly directed attaching tab 24. By loosening the bolts of the assembly 16, the finger mount 12 may be adjusted transversely along the support 20. A plurality of the finger mounts are evenly spaced along the length of the support 20 to define plant receiving gaps (See g of FIG. 9A).

Attached to each finger mount 12 is a stripping finger 32, preferably fabricated from an angle iron, having a V-shaped cross section with opposed angled sides 34 joined at a vertex 38 which defines the bottom of the finger. The finger 32 has a tapered forward end 42 and is connected at the area of the vertex 38 at weld locations 44 to the attaching tab 24 rearwardly of the end 42. The weld locations 44 are spaced in the fore-and-aft direction for strong support and finger shape retention. The finger mount 12 supports the finger 32 with an upward angle in the rearward direction (to the right as viewed in FIG. 1). A substantial rear portion of the finger is cantilevered from the weld location area.

The tapered forward end 42 of the finger 32 is angled upwardly at 52 from the elongate axis of the remainder of the finger 32 so that bottom 56 of the end 42 approaches a generally horizontal or slightly upwardly directed attitude during normal field-working operations to help avoid digging down into the dirt. The insert 32 extends rearwardly and upwardly to an uppermost end 58 which is offset directly above the bracket and bolt assembly 16 (FIG. 1).

An upright planar fin 60 extends through a slot in the vertex of the forward end 42 and is welded at locations 62 (FIG. 2) on either side of the slot to define a point or divider to steer the finger to one side or the other of a plant stalk. The fin 60 also keeps cotton from falling off the fingers 32 when no stalks are coming through the gaps g (i.e. when there are bare spots in the field, or when turning at the end of a pass). The fin 60 includes an aft edge 62 which extends generally from the top of the fin 60 at a right angle to the elongate axis of the finger 32 and then angles forwardly above the vertex 38 to define an insert wedging area at 68 which, as described in detail below, forms the forward attaching area for a gap-adjusting inserts 70 or 70' of differing widths.

Forwardly of the uppermost end 58, the finger 32 is apertured at the vertex 38. A nut 72 (FIG. 1) is fixed to the underside of the finger in alignment with the aperture. The nut 72 is located above and slightly forwardly of the bend location for the down-turned end 14.

The inserts 70 and 70' are generally identical, and the insert 70' has an effective width slightly greater than that of the insert 70. Therefore only the insert 70 will be described in detail below. The cross section of the insert 70 conforms generally to that of the stripping finger 32 and includes sidewalls 74 joined at a lower, central vertex 78. The insert sidewalls 74 rest against the sides 34 of the finger 32 with the edges of the inserts 70 projecting upwardly and outwardly from the edges of the finger 32. The insert 70 has a forward tapered end 82 to avoid catching stalks and cotton, and a nose section 84 that wedges in the area 68 under the aft edge 62 of the fin 60. The vertex 78 of the rear portion of the insert 70 is apertured at 90, and the aperture 90 aligns with the aperture in the finger vertex 38 when the nose section 84 is wedged in the area 68. A single connecting bolt 94 extends through the apertures in the vertex 86 and the vertex 38, and through a special clip 100. The end of the bolt is threaded into the nut 72 to secure the insert 70 in position.

The special clip 100 includes a tapered, sloped forward face 102, a similar tapered, sloped rear face 104, and a flat upper surface 106 which is apertured at 108 to align with the aperture 90 to receive the bolt 94. The edges of the forward face 102 conform to and abut the sidewalls 74 to define a smooth, closed front surface ramp adjacent the vertex 78 which accommodates the centrally located bolt 94 while avoiding an area that could snag crop and other material. Similarly, the edges of the rear face 104 abut the sidewalls 74 and provide a closed rear ramp area. The flat, apertured upper surface 106 extends perpendicularly to the axis of the bolt 94 to provide solid, even seating of the bolt head. As the bolt 94 is tightened, the edges of the faces seat against the sidewalls 74 to provide a firm support.

By providing different combinations (see FIGS. 9A–9E) of no inserts, narrow inserts (70), and wider inserts (70'), five different gap sizes can be achieved utilizing only two different inserts. FIG. 9A shows the widest gap g determined by the set spacing of the fingers 32 on the support 20 with no inserts attached to the fingers. By adding a narrow insert 70 to alternating fingers 32 (FIG. 9B), the gap can be reduced slightly. Adding the narrow insert 70 to all the fingers 32 (FIG. 9C) reduces the gap a bit more. If a narrower gap is required, a narrow insert 70 can be alternated with a wider adjacent insert 70' (FIG. 9D). To achieve the narrowest gap, for example, when the stalks of the plants are very thin, the wide inserts 70' are attached to every stripping finger 32. Preferably the stripping edges of the fingers 32 and inserts 70 and 70' are somewhat smooth and rounded to avoid peeling bark off the plants.

The inserts 70 and 70' can be added, removed or changed easily. Only a single bolt 94 is required to secure an insert, and the location of the bolt at the vertex of the assembly makes access convenient and reduces plugging problems associated with sidewall attached inserts.

Having described the preferred embodiment, it will become apparent that various modifications can be made without departing from the scope of the invention as defined in the accompanying claims.

What is claimed is:

1. Insert structure for a stripping finger having a V-shaped cross section, the stripping finger adapted for forward movement through a field of plants for stripping crop from the plants, the stripping finger including a forward fin having an insert receiving area, the insert structure comprising:

a V-shaped insert having sidewalls and a vertex joining the sidewalls at a lowermost position, the insert positionable in mating relationship on the finger and including a forward end adapted for securing in the insert receiving area of the fin;

the insert extending rearwardly from the forward end to a rearwardly located attaching portion having a single bolt-receiving aperture located on the vertex for receiving a mounting bolt therethrough;

wherein the securing of the forward end in the insert receiving area of the fin and the mounting bolt secure the insert to the stripping finger independently of additional fasteners; and further comprising a bolt-receiving member defining a flat apertured area above the vertex for receiving the mounting bolt therethrough.

2. The insert structure as set forth in claim 1 wherein the bolt receiving member includes a forwardly sloped leading wall having edges supported against the insert sidewalls to form a smooth transition area at the attaching portion.

3. The insert structure as set forth in claim 2 wherein the forward end of the insert is tapered and converges to a narrowed area in the forward direction, the narrowed area adapted for wedging under the fin.

4. Insert structure for a fore-and-aft extending stripping finger having a forward end, the stripping finger supported adjacent a second stripping device and defining a gap therebetween for stripping crop from the plants as the plants pass between the gap, the insert structure comprising:

an insert positionable on the finger and including a forward end adapted for receipt by the forward end of the finger;

the insert extending rearwardly from the forward end of the finger to an attaching portion having a bolt-receiving aperture therein for receiving a mounting bolt therethrough;

wherein the insert has sidewalls joined at a vertex and defining a V-shaped cross section opening upwardly;

further comprising a bolt receiving area in the vertex centrally located between the sidewalls adjacent the aperture, and a connecting bolt, the bolt receiving area facilitating mounting of the bolt in the vertex so that the sidewalls of the insert are substantially devoid of fastening structure to avoid snagging of the crop on the sidewalls and including a bolt receiving member having a forwardly sloped forward face with edges supported against the insert sidewalls to form a smooth transition area at the bolt receiving area.

5. The insert structure as set forth in claim 4 comprising a boltless forward connection and wherein the forward end is secured under an upright member on the finger.

6. The insert structure as set forth in claim 4 wherein the bolt receiving member includes a tapered, shaped rear face conforming to the profile of the insert.

7. The insert structure as set forth in claim 4 wherein the stripping finger has a first width, and the insert has a second width greater than the first width, and further comprising an additional insert having a third width greater than the first width and different from the second width, the insert and additional insert selectively attachable to and removable from next adjacent stripping fingers to thereby provide up to five different gap sizes.

8. The insert structure as set forth in claim 4 wherein the stripping finger includes a connecting area at the forward end, wherein the finger includes a substantial portion cantilevered rearwardly from the connecting area, and further comprising an upwardly extending attaching tab and first and second spaced welds fixing the tab to the connecting area.

* * * * *